June 16, 1936.　　　A. L. PARKER　　　2,044,629
CHECK VALVE FOR FLUID PRESSURE PIPES
Filed June 4, 1934
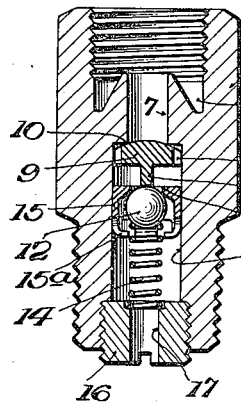
Fig. 1.
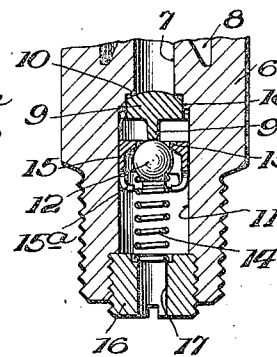
Fig. 2.
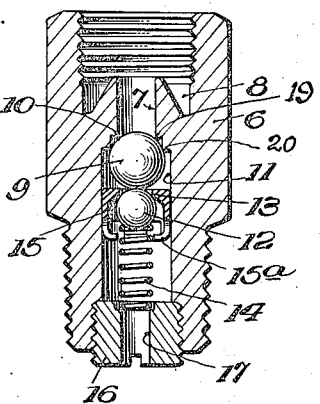
Fig. 3.
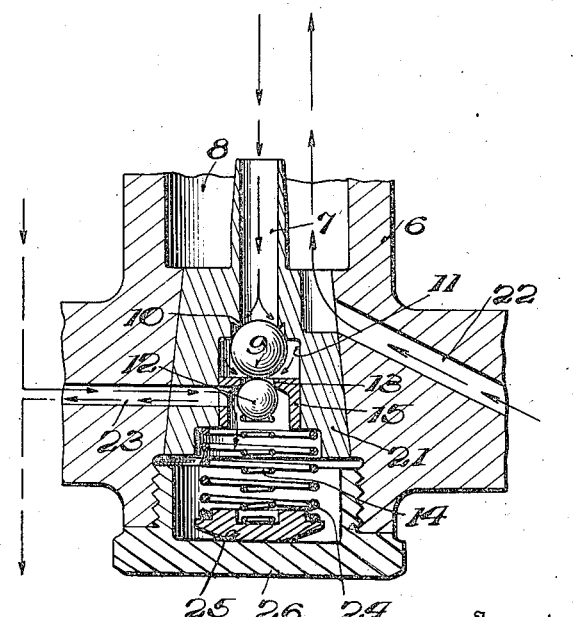
Fig. 4.
Fig. 5.
Inventor
Arthur L. Parker
By Sturtevant Mason
Attorneys Patented June 16, 1936

2,044,629

UNITED STATES PATENT OFFICE 2,044,629

CHECK VALVE FOR FLUID PRESSURE PIPES

Arthur L. Parker, Cleveland, Ohio

Application June 4, 1934, Serial No. 729,005

4 Claims. (Cl. 277—42)

This invention relates to check valves and aims to provide certain new and useful improvements of construction in such valves which will be applicable to various uses and in particular for use in connection with fluid pressure lines where the flow of the fluid is intermittent.

A primary object of the invention is to provide a check valve which will open with moderate fluid pressure but will resist opening by suction, or, wherein the pressure of fluid necessary to unseat the valve will be less than the spring pressure ordinarily required to hold the valve upon its seat against the pull action of suction in the line.

Another object is to provide a check valve of simple construction embodying the fewest possible parts for the stated function and requiring a minimum of workmanship in fitting such parts operatively together.

These and other objects as well as the general concept and advantages of the invention will in part be obvious and in part be more fully disclosed by the following description with reference to the attached drawing illustrating one practicable embodiment of the invention.

In the drawing:

Figure 1 is a longitudinal sectional view of a casing with fluid passage having the check valve arranged therein;

Fig. 2 is a similar view illustrating a modification of the valve;

Fig. 3 is another similar view illustrating another modification of the valve;

Fig. 4 is a somewhat enlarged detail view of a part of the last mentioned modification; and, Fig. 5 is a sectional longitudinal view of part of a primer pump, showing the check valve applied thereto.

It may facilitate understanding to here state that the invention is directed broadly to a check valve construction wherein two valve members of different areas are disposed in the fluid line or passage, one behind or under the other, with seatings in the same direction, said two members being in constant contact or connection with each other and opening simultaneously by pressure of fluid exerted upon one of the same and closing simultaneously by force of a spring means applied to the other thereof, the seating areas of the two members being correspondingly sized and spaced apart within the passage.

In the illustrative embodiment, a valve casing is represented by the shell 6. This shell has a longitudinal inlet passage 7 therein opening from a larger passage or chamber 8, which connects with the fluid supply line or may form the working cylinder of a pumping plunger (not shown), and fluid under pressure from such plunger or other impellive means in the line is driven through this passage as occasion may require.

Said inlet passage is closed by a valve member 9, of piston form in this instance, held against a seat 10 provided at the end or bottom of the passage, said valve being formed with peripheral openings or serrations 9a through which the fluid may pass therearound when the valve is unseated. This valve works in a somewhat enlarged chamber 11 forming a continuation of the aforesaid passage (7) and is guided to closure upon its seat by the walls of said chamber. In this instance a central projection or arm 9b is provided on the opposite face of the valve for a purpose which will presently appear.

Behind or under the first-mentioned valve (9) is a second and smaller valve member 12, shown in the form of a ball, held normally to a seat 13 of smaller area than the first mentioned seat (10). This second valve member bears constantly against or connects with the first named valve member through the arm 9b of the former, so as to move therewith in opposite directions to and from seating position. It is held normally in such contact and to its aforesaid seat (13) by a spring 14 applied thereunder, and in turn holds the first named valve also to its seat, said spring having a strength or tension to hold both the smaller and the larger valve members to firm seating against the force of any suction in the line which might otherwise unseat the valves and allow the leakage of fluid around them. This spring thus serves to hold the two valve members normally and simultaneously seated as a single unit.

The seat of said second and smaller valve member (12) is formed advantageously by a cage 15 fitting snugly within the chamber 11 by friction against its wall. This seat is provided in the top surface of said cage within which the valve member itself is confined and held from dropping out by depending finger portions 15a thereof bent around under said member. The aforementioned spring (14) passes through a central opening in the bottom of this cage so as to engage as described under the member.

The opposite or bottom end of said spring (14) bears against a plug 16 shown screwed into the shell at the end of the chamber (11) wherein the two valve members operate, said plug having an outlet passage 17 therethrough forming a continuation of the feed line through the valve. This plug or the end of the shell may of course be connected with a pipe section leading to the point of delivery.

The purpose of the two valve members of different seating areas, working as one, is to enable the same to open under a lesser fluid pressure than would be possible if only one valve member were used. In the case of a single valve member, the tension of the spring required to hold it closed against suctional unseating necessitates a greater pressure of fluid to open it. In this case, however, the pressure necessary is reduced because the fluid acts upon the larger valve member (9) against the tension of the spring holding the smaller valve member (12) closed and this tension is less than it would be for the larger member so that a comparatively low pressure is sufficient to open the one by the other. It is much less than it would be if the larger valve member were omitted, because the fluid has the larger area thereof on which to act with effect upon the smaller valve member. A higher spring tension can therefore be put on the smaller valve member for more effectual and positive seating. The valve unit operates entirely on the principle of unequal seating areas, and the fluid flow is of course always against the larger member from the top to the bottom of the housing shell.

It will be noted that the respective valve seats (10 and 13) are entirely separate from each other and are acted upon independently, the one and its valve being acted upon exclusively by fluid pressure, and the other and its valve being acted upon exclusively by suction in the line. The valve members in effect form partitions between the two seats so as to separate them from the forces which act upon them individually.

The larger seating member acting on the smaller spring-loaded seating member opens the valve against said spring tension with less pressure because the pressure is acting on the larger area provided by the larger valve. Thus, if the tension of the spring on the smaller valve is sufficient to hold the same closed against a suction for example of fifteen pounds, it will require a fluid pressure of less than fifteen pounds to open the two valves, whereas it would require a pressure exceeding fifteen pounds if there were only the one small valve to be acted upon by the fluid. Such a high pressure need would, of course, be unfeasible in many check valve constructions, and would be especially unfeasible in a primer pump for gas engines, because it would be disadvantageous to build up such a fluid pressure in the pump. The described valve therefore has the important advantage of remaining closed under a comparatively high suction in the line and opening under a comparatively low pressure of pumped fluid.

In the modification of Fig. 2, the upper larger valve 9 is of a somewhat different form and works upon a different seat, although the construction is otherwise the same. Said valve in this instance omits the peripheral openings or serrations (9a) and is formed simply as a solid piston body. It bears as before described upon a seat 10 formed by a shoulder in the passage, but moves within a short cylinder 18 provided by the wall of the shell. It thus has to open a greater distance than in the first described form, thereby forcing a larger opening of the associated smaller valve 12. Its contact or connection with said smaller valve is effected as in the first described form through an arm 9b projecting from its center.

In the modification of Fig. 3, said larger valve 9 is in the form of a ball which rests directly upon the smaller valve 12. Its seat is formed in this instance by a fine edge 19 and an auxiliary seat 20 is provided in the wall of the casing around said main seat so as to provide a guide and firmer seating therefor. This is shown in enlarged detail in Fig. 4. As the valve in this form operates, its action on the main fine-edge seat (19) gradually wears said edge down to a slight extent so as to form a narrow surface conforming thereto, after which it will bear lightly upon the auxiliary seat also, thus preventing further wear and effecting a tighter seating.

In Fig. 5, the valve construction is illustrated in application to a primer pump for gas engines of the character and general form shown for example in my previous Patents No. 1,934,878 dated November 14, 1933 and No. 1,942,255 dated January 2, 1934, respectively entitled "Primer for gas engines". In this instance the aforedescribed shell (6) comprises the casing of the pump, and the valve members 9 and 12 are arranged within a plug 21 fitted into the bottom of said casing substantially as described in each of the aforementioned patents. An intake port 22 controlled by a check valve (not shown) connects with a source of fluid supply and an outlet port 23 through the side of said plug (21) connects with a distributor (not shown) to the gas engines, instead of passing directly through longitudinally as shown in the preceding views. A spring 24 serves to seat the plug (21) firmly in the housing by tension against a balancing pivot block 25 and the latter bears against a closure cap 26 screwed into the bottom of the casing. The valve seating spring (14) bears against this pivot block instead of the plug (16) of the first described views, and is accordingly balanced with the second-named spring (24) in this element so as to function in its intended way.

It will be understood that fluid drawn into the casing (6) by the retraction of the pumping plunger (not shown) will, upon the subsequent downward stroke of the plunger, open the larger of the two valve members with the result that the smaller of said members will also be opened by the pressure of the former against the latter, thereby allowing the fluid to pass around the two elements and discharge through the aforesaid outlet port (23) to the distributor of the engines. At the completion of this stroke and when the pump plunger is not in operation, the valve members will be reseated by action of the spring (14), where they will be held against any suction in the outlet line.

In each instance of the aforedescribed arrangements, the cage (15) for the smaller valve is pressed into place within the chamber 11 by pressure applied to said smaller valve and not by pressure applied to the cage itself. As thus applied, the cage is moved to position in its chamber with said smaller valve contacting its seat and driving the larger valve likewise into contact with its seat, with the two valve members contacting or bearing together. In its press fit thus to place, the cage is tight enough to hold frictionally in the position established, without possibility of fluid leakage around its sides.

While the invention has been described in a particular arrangement and use, it will be understood that it may be broadly applied in various ways to different constructions wherein a valve is desired to function in the manner described. The various parts in modificational forms may be used in various organizations and in various combinations or subcombinations without a departure from the scope of the invention, and it is therefore not intended to restrict the same by the appended claims to the specific construction or arrangements shown.

Having thus described my invention, what I claim as new and desire to secure by Letters Patent of the United States is:

1. A check valve for a fluid dispensing system comprising a casing having an inlet adapted to be subjected to fluid under pressure and an outlet adapted to be subjected to a suction pull, said casing having a passage joining said inlet and said outlet, spaced valve seats of different areas arranged in said passage, the larger of said valve seats being located adjacent the inlet, a valve member for each of said valve seats, said valve members directly contacting with one another and moving as a unit, and a single spring bearing solely against the smaller of said valve members for holding both of said valve members seated against a suction pull on said outlet, the fluid under pressure on the larger valve member at the inlet operating to unseat both of said valve members to permit the flow of fluid through said valve casing.

2. A check valve including a casing having a passage therethrough for fluid under pressure, two valve seats arranged longitudinally of said passage, said valve seats being separated from one another and being of different areas, the larger of said valve seats being located at the point of entry of fluid into said passage, a valve member for each of said valve seats, the larger of said valve members constantly bearing on the smaller of said valve members by gravity and both of said valve members moving as a unit, and a single spring bearing solely on said smaller valve member and serving as the sole means for holding both of said valve members seated against a suction pull through said casing.

3. A check valve including a casing having a passage therethrough for fluid under pressure, a relatively large valve seat located at the point of entry of fluid into said passage, an independent member pressed within said passage and having a longitudinal opening therethrough forming a relatively small valve seat, a valve for said large valve seat, a valve for said smaller valve seat housed within said independent member, said valves constantly contacting with one another through the opening in said independent member and moving as a unit, and a single spring bearing solely against the smaller of said valves and operating thereon to hold both of said valves seated against a suction pull through said casing.

4. A check valve including a casing having a passage therethrough for fluid under pressure, a relatively large valve seat located at the point of entry of fluid into said passage, an independent cage member pressed within said passage and having a longitudinal opening therethrough forming a relatively small valve seat, a valve member for said large valve seat, a valve member for said smaller valve seat, said valve members constantly contacting with one another through the opening in said cage member and moving as a unit, said cage member having depending inwardly turned fingers adapted to engage said smaller valve member to limit the downward movement thereof, and a single spring extending between said fingers and bearing solely on said smaller valve member for holding both of said valve members seated against a suction pull through said cases.

ARTHUR L. PARKER.